(12) United States Patent
Elizalde et al.

(10) Patent No.: US 6,443,347 B1
(45) Date of Patent: Sep. 3, 2002

(54) STREAMLINED PERSONAL HARNESS FOR SUPPORTING A WEARABLE COMPUTER AND ASSOCIATED EQUIPMENT ON THE BODY OF A USER

(75) Inventors: Luis E. Elizalde, Durham; Ronald A. Smith, Wake Forest, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 day.

(21) Appl. No.: 09/692,280

(22) Filed: Oct. 19, 2000

(51) Int. Cl.[7] .................................................. A45F 3/02
(52) U.S. Cl. ........................ 224/626; 224/602; 224/245; 224/643; 224/264; 224/901.4; 224/901.6; 224/930
(58) Field of Search ................................ 224/601, 602, 224/603, 623, 625, 626, 637, 639, 640, 645, 646, 235, 236, 242, 245, 246, 264, 901.4, 901.6, 930, 643

(56) References Cited

U.S. PATENT DOCUMENTS

| | | | | |
|---|---|---|---|---|
| 2,372,971 A | * | 4/1945 | Moore | 224/624 |
| 5,211,321 A | * | 5/1993 | Rodriguez | 2/102 |
| 5,285,398 A | | 2/1994 | Janik | |
| 5,305,244 A | | 4/1994 | Newman et al. | |
| 5,450,596 A | | 9/1995 | Felsenstein | |
| 5,572,401 A | | 11/1996 | Carroll | |
| 5,581,492 A | | 12/1996 | Janik | |
| 5,746,365 A | * | 5/1998 | Scott | 224/236 |
| 5,774,338 A | | 6/1998 | Wessling, III | |
| 5,798,907 A | | 8/1998 | Janik | |
| 5,844,824 A | | 12/1998 | Newman et al. | |
| 5,915,609 A | * | 6/1999 | Diakoulas | 224/625 |
| 5,927,574 A | * | 7/1999 | Ruesink | 224/149 |
| 6,035,450 A | * | 3/2000 | Monsen, III et al. | 2/422 |
| 6,155,471 A | * | 12/2000 | Lichtenberger | 224/242 |
| 6,260,202 B1 | * | 7/2001 | Villalobos et al. | 2/102 |

FOREIGN PATENT DOCUMENTS

WO    WO 99/48082    3/1999

OTHER PUBLICATIONS

Via II PC Price Guide, pp. 1–2, Date Unknown.
http://www.tekgear.ca/index.html, Date unknown.

* cited by examiner

*Primary Examiner*—Stephen K. Cronin
(74) *Attorney, Agent, or Firm*—J. Bruce Schelkopf; Andrew J. Dillon

(57) ABSTRACT

A personal harness for a wearable computer on the body of a user has a waist belt and a shoulder sling that are integrally formed with each other. The waist belt is inelastic and forms a belt around the waist of the user. The waist belt has a strap with hook-and-loop fasteners for adjusting the circumference of the waist belt. The shoulder sling is draped over one shoulder of the user and has front and rear sashes with primary and secondary compartments, respectively. The primary compartment has a zipper along one side edge and a sealable flap at an upper end for containing wearable computer hardware. The secondary compartment also has a sealable flap at an upper end for supporting telecommunications equipment for the computer on the body of the user. In addition, both compartments have mesh windows for ventilating the equipment.

26 Claims, 9 Drawing Sheets

STREAMLINED PERSONAL HARNESS FOR SUPPORTING A WEARABLE COMPUTER AND ASSOCIATED EQUIPMENT ON THE BODY OF A USER

BACKGROUND OF THE INVENTION

1. Technical Field

The present invention relates in general to a device for improving the portability of a computer, and in particular to an improved device for supporting a portable computer. Still more particularly, the present invention relates to an improved harness for supporting a hands-free, wearable computer on the body of a user.

2. Description of the Prior Art

"Wearable computers" are diminutive personal computer systems that are mounted to and completely supported on the body of the user. Wearable computers are typically installed in or on an outer garment that is worn by the user. The components of wearable computers, such as the central processing unit (CPU) or computer itself, power source or battery, user interface devices, display/monitor and display driver, and system expansion devices, may be wireless, hard-wired to the other components, or some combination thereof. The usability, management, and accessibility of these various components while they are supported on the user's body is a critical issue for the users of wearable computers.

In the prior art, a number of garments have been devised to package and support wearable computers on the body of a user. Examples of garments for wearable computers include utility belts that are secured around the waist of a user, and vests or ponchos that are secured to the upper body of the user. Each prior art garment has a number of limitations and problems. Many prior art garments require the computer and its components to be secured to an exterior of the garment. This type of packaging solution not only encumbers the user and creates a morass of wires and cables that can pose safety issues, but it is also aesthetically undesirable. Other prior art garments have pockets that are designed to contain the equipment, but the pockets are typically small and have very limited versatility. Those prior art garments with large pockets or pouches often go to the extreme of being oversized and, thus, bulky and cumbersome when loaded with equipment.

Other problems with prior art garments include their lack of ability to adequately manage cabling between the various components of a wearable computer that are located in different pockets on the garment. In addition, some garments may provide adequate storage or support when the user is either sitting or standing, but not the other. Moreover, these types of prior art garments may require installation of the computer in the garment either before or after the user puts it on, and are often difficult for the user to put on without assistance. Thus, an improved outer garment for comfortably supporting a wearable computer and all of its accessories on the body of a user that also maintains an aesthetically pleasing appearance is needed.

SUMMARY OF THE INVENTION

A personal harness for a wearable computer on the body of a user has a waist belt and a shoulder sling that are formed with each other. The waist belt is inelastic and forms a belt around the waist of the user. The waist belt has a strap with hook-and-loop fasteners for adjusting the circumference of the waist belt. The shoulder sling is draped over one shoulder of the user and has front and rear sashes with primary and secondary compartments, respectively. The primary compartment has a zipper along one side edge and a sealable flap at an upper end for containing wearable computer hardware. The secondary compartment also has a sealable flap at an upper end for supporting telecommunications equipment for the computer on the body of the user. In addition, both compartments have mesh windows for ventilating the equipment.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
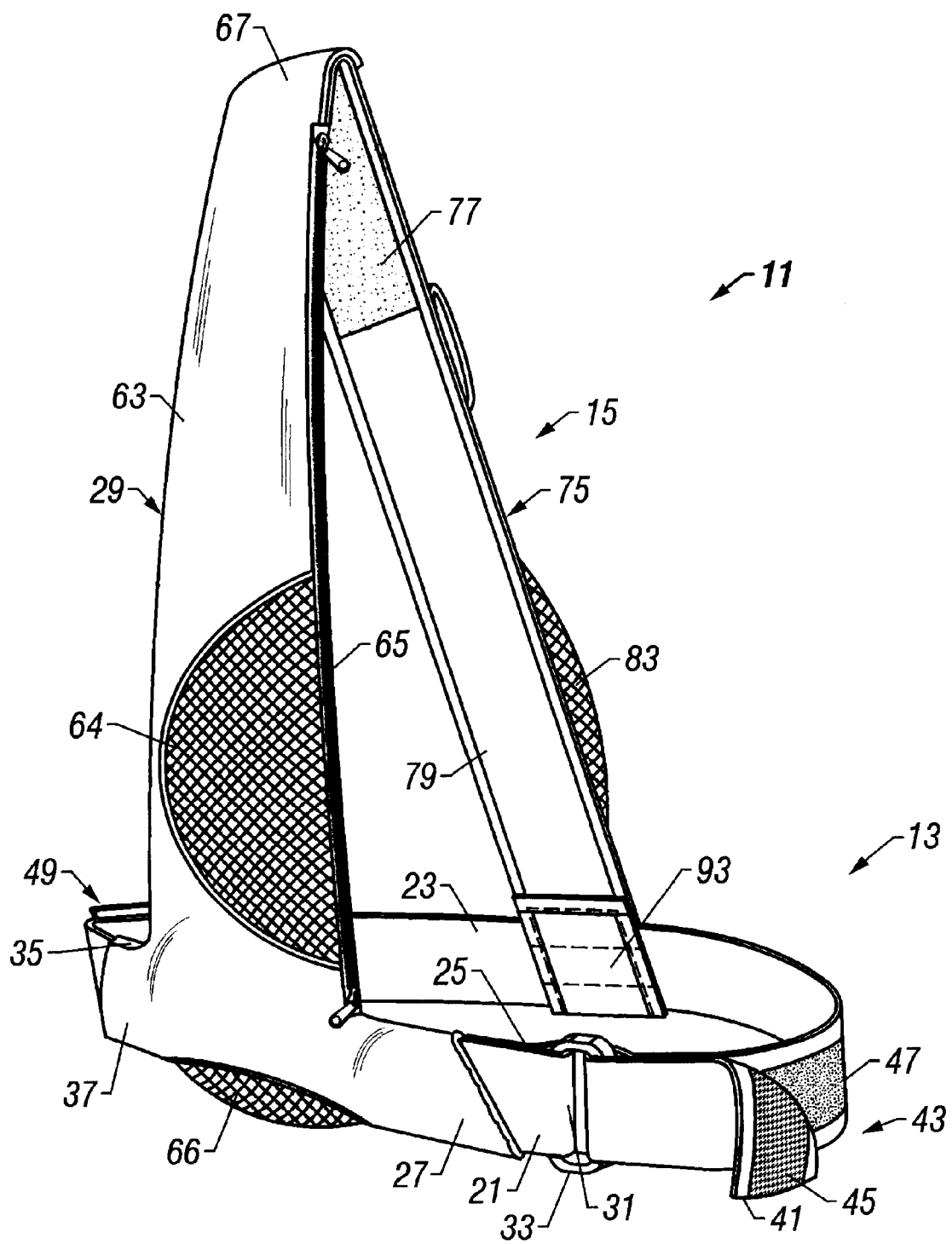
FIG. 1 is a front isometric view of a harness for a wearable computer constructed in accordance with the invention.

Referring to FIG. 1, a personal harness 11 for a computer that is designed to be worn on the body of a user is shown. Harness 11 has a substantially horizontally-oriented waist belt 13 and a substantially vertically-oriented shoulder sling 15. Shoulder sling 15 is integrally formed with and extends from waist belt 13. Waist belt 13 and shoulder sling 15 are preferably sewn together. As will be discussed in further detail with respect to FIG. 7, waist belt 13 is provided for being placed or wrapped around the waist of the user, and shoulder sling 15 is provided for being worn over a shoulder of the user.

In the embodiment shown, waist belt 13 is a two segment design having a short belt segment 21 and a long belt segment 23. Both belt segments 21, 23 are formed from a flat, wide band of substantially inelastic, braided or woven nylon. An inner end 25 of short belt segment 21 is sewn to a lower left tail 27 (relative to the user) of a primary compartment or front sash 29 of shoulder sling 15. The outer end 31 of short belt segment 21 is formed into a loop to retain one side of a rigid, elongated belt buckle or ring 33.

An inner end 35 (see FIGS. 1 and 4) of long belt segment 23 is sewn to a lower right tail 37 of front sash 29 and extends in a generally circular fashion (i.e., around the waist; see FIGS. 14 and 15) to ring 33. A free end 41 (FIG. 1) of long belt segment 23 extends through ring 33 in a radially outward direction and wraps back on itself to form an adjustment means 43 for adjusting a circumference of waist belt 13. Preferably, adjustment means 43 is adjusted via hook-and-loop fasteners (e.g., VELCRO®) having hooks 45 on the inner surface of long belt segment 23 adjacent to free end 41, and loops 47 along most of the outer surface of long belt segment 23. Other means for adjusting waist belt 13, such as elastic elements, also may be used. In one version, the circumference of waist belt 13 is adjustable between the range of approximately 30 to 45 inches.

Figure 4:
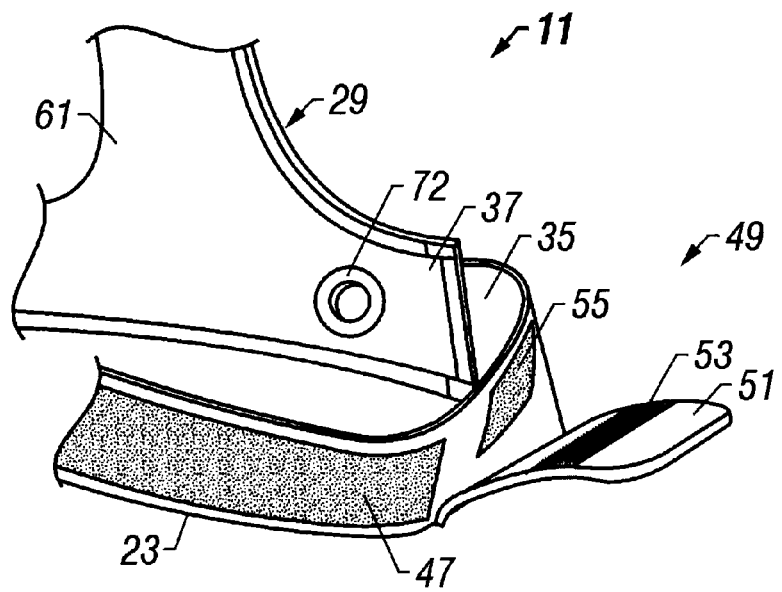
FIG. 4 is a rear isometric view of the primary compartment of FIG. 2 and a retention device.

As shown in FIG. 4, waist belt 13 also has a retention device 49 mounted to the outer surface of long belt segment 23 near its inner end 35. Ideally, retention device 49 is located between lower right tail 37 and the right side end of loops 47 (the version shown is ideally suited for right-handed users). Retention device 49 is essentially a padded flap 51 having a lower edge that is sewn to long belt segment 23. A strip of hooks 53 are provided on the inner surface of flap 51 for releasably engaging a strip of loops 55 on the outer surface of long belt segment 23. As will be explained below in further detail, retention device 49 is provided for retaining an excessive length of wiring associated with a wearable computer.

Referring again to FIG. 1, the primary compartment or front sash 29 of shoulder sling 15 is generally shaped in the form of an inverted "T," including left and right tails 27, 37 on its lower end. Ideally, inner ends 25, 35 of waist belt 13 are located and sewn in pockets formed in tails 27, 37, respectively. Front sash 29 extends upward from waist belt 13 to form the primary compartment defined between an inner layer 61 (FIG. 2) and an outer layer 63. In the preferred embodiment, inner layer 61 comprises a substantially inelastic braided or woven nylon denier backing material that is padded, and outer layer 63 comprises an elastic neoprene cover. In the embodiment shown, a pair of generally semi-circular windows 64, 66 are integrally formed in outer layer 63 for ventilating primary compartment 29. Windows 64, 66 are preferably formed from a nylon mesh material at the midsection and lower end, respectively, of primary compartment 29.

Figure 2:
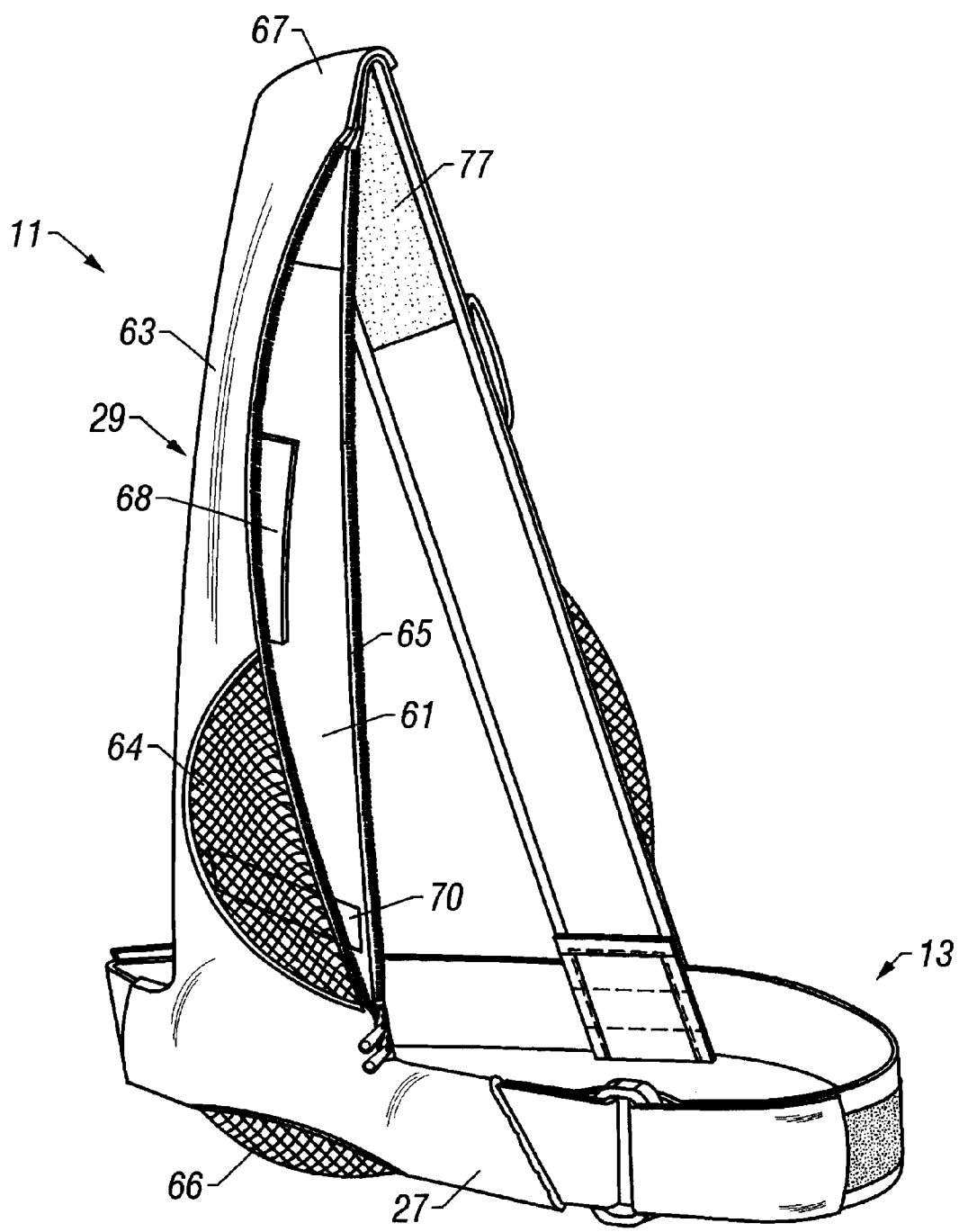
FIG. 2 is a front isometric view of the harness of FIG. 1 with a primary compartment thereof shown in an open position.

Inner and outer layers 61, 63 are sewn together along their substantially vertical right hand edges (relative to the user), and have a first sealable closure, such as a zipper 65, extending along their left hand edges. Zipper 65 extends from approximately the upper end of left tail 27 to the upper end of outer layer 63 and is variably operable between a fully closed position (FIG. 1) and a fully open position (FIG. 2). As shown in FIG. 2, a pair of elastic straps 68, 70 are provided in primary compartment 29 (preferably on inner layer 61) for securing the components of electrical equipment therein. Elastic straps 68, 70 are sewn at their ends to the outer surface of inner layer 61, and are substantially vertical and horizontal, respectively, in orientation. Primary compartment 29 also has a port or eyelet 72 (FIG. 4) located in the lower end of inner layer 61 adjacent to right tail 37. Eyelet 72 provides wire or cable access to primary compartment 29, as will be described below.

Figure 3:
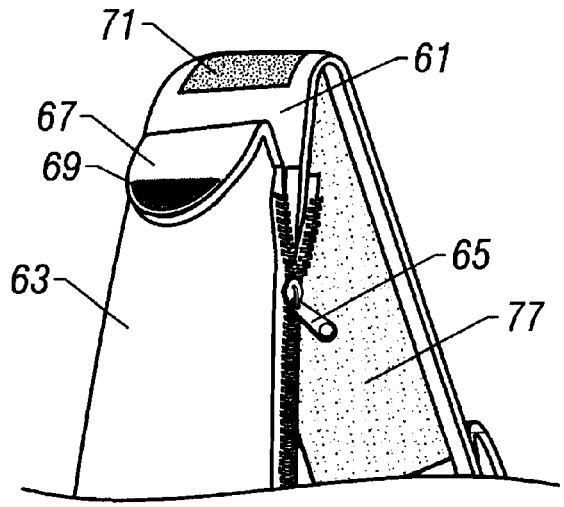
FIG. 3 is an enlarged front isometric view of the primary compartment of FIG. 2 and an auxiliary closure in an open position.

An auxiliary sealable closure 67 (FIG. 3) is located at the upper end of outer layer 63 and utilizes hook-and-loop fasteners to provide access to the upper portion of primary compartment 29. Like retention device 49, auxiliary sealable closure 67 preferably comprises a flap with a strip of hook material 69 for engaging a strip of loop material 71 on the outer surface of inner layer 61. Auxiliary sealable closure 67 is completely independent of zipper 65 and may be operated between an open position (FIG. 3) and a closed position (FIGS. 1 and 2). Closure 67 also may be used to support and retain a head mounted display 111 (FIG. 13) or other equipment.

Figure 5:
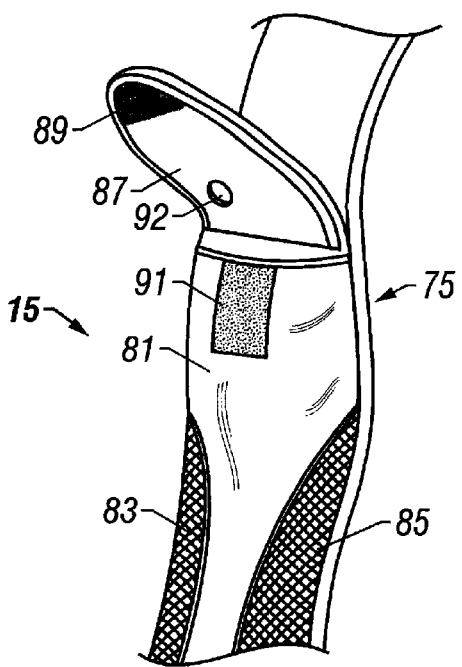
FIG. 5 is an enlarged rear isometric view of a secondary compartment of the harness of FIG. 1 in an open position.

Referring now to FIGS. 1 and 5, shoulder sling 15 also has a secondary compartment or rear sash 75 that is integrally formed with and extends continuously from front sash 29. As shoulder sling 15 transitions from front sash 29 to rear sash 75, the underside or inner surface of shoulder sling 15 is provided with a textured material 77 (FIG. 1) for improving the grip and resisting slippage of shoulder sling 15 with respect to a shoulder of the user. Like front sash 29, the secondary compartment of rear sash 75 is defined between an inner layer 79 (FIG. 1) and an outer layer 81 (FIG. 5). Inner layer 79 is a substantially inelastic braided or woven nylon denier backing material that is padded, and outer layer 81 is an elastic neoprene cover. A pair of semi-circular windows 83, 85 are opposed to each other and integrally formed in outer layer 81 for ventilating secondary compartment 75. Windows 83, 85 are formed from a nylon mesh material near the midsection of secondary compartment 75.

Figure 12:
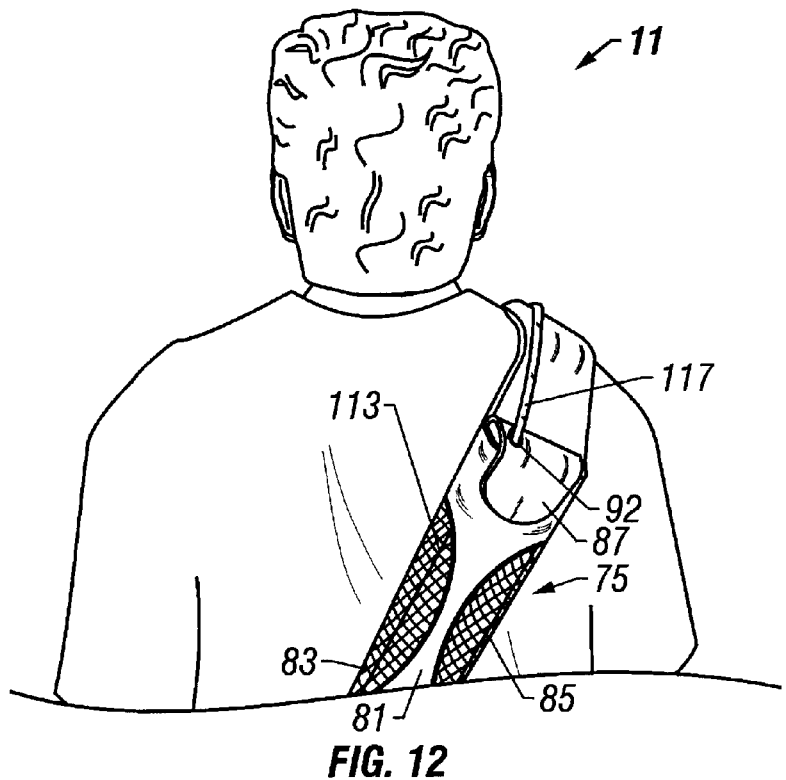
FIG. 12 is a rear isometric view of the harness and user of FIG. 7 with equipment in the secondary compartment which is shown in a closed position.

Inner and outer layers 79, 81 are sewn together with windows 83, 85 along their substantially vertical edges. A second sealable closure 87 is located at the upper end of secondary compartment 75. In the embodiment shown, second sealable closure 87 is a neoprene flap with hook-and-loop fasteners to provide access to secondary compartment 75 at its upper end. The inner surface of the flap or second sealable closure 87 has a strip of hook material 89 for engaging a strip of loop material 91 on the outer surface of outer layer 81. Flap 87 is also has a hole 92 for wires or cables to extend therethrough. Flap 87 is operable between an open position (FIG. 5) and a closed position (FIG. 12). As shown in FIG. 1, the lower end 93 of rear sash 75 is integrally formed with a rear portion of long belt segment 23. Ideally, the lower end of inner layer 79 forms a flat loop into which long belt segment 23 is sewn with fastener loops 47 (FIG. 15) on an outer surface thereof.

Figure 6:
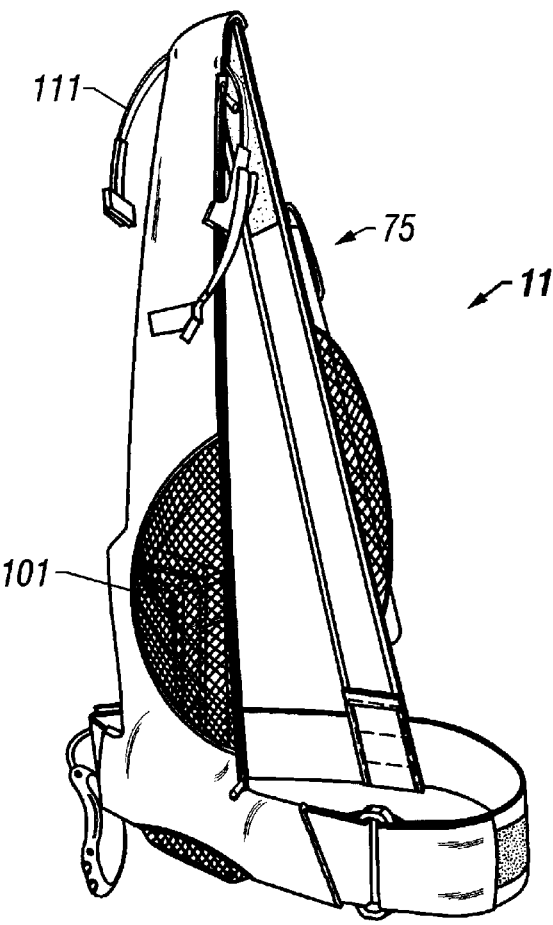
FIG. 6 is an isometric view of the harness of FIG. 1 loaded with equipment and shown prior to being donned by a user.
Figure 7:
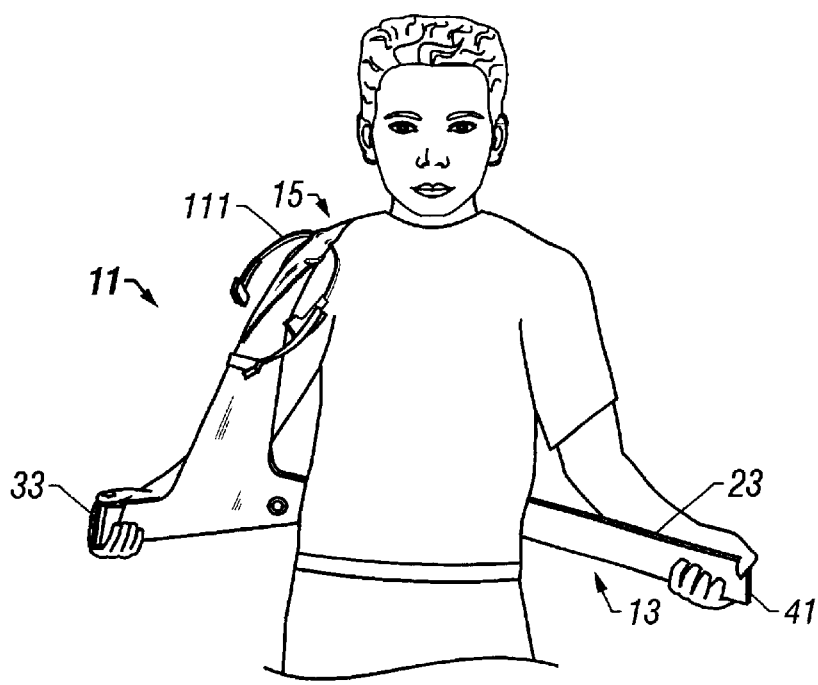
FIG. 7 is an isometric view of the harness of FIG. 1 at an initial stage of installation on a user.

In operation (FIGS. 6–15), the user may place the electrical equipment in harness 11 either before (FIG. 6) or after he or she is wearing harness 11. However, it is preferable to install the equipment in harness 11 prior to donning harness 11. As shown in FIG. 7, shoulder sling 15 is placed on and supported by a shoulder of the user (right shoulder sling shown) of the user and waist belt 13 is located around the waist of the user. By sliding the released long belt segment 23 through ring 33 in either direction, the circumference of waist belt 13 is tailored to the size of the user. Waist belt 13 is adjusted for a comfortable fit via adjustment means 43 (FIG. 1) by pulling free end 41 of long belt segment 23 away from the body to release hooks 45 from loops 47. Waist belt 13 is retained at the desired circumference (FIG. 14) by reattaching hooks 45 to loops 47. Although shoulder sling 15 is not shown or described in an adjustable configuration, it should be apparent that it may be provided in such a configuration. The textured material 77 (FIG. 1) on the inner surface of shoulder sling 15 helps maintain harness 11 in the proper position on the user and, in particular, prevents shoulder sling 15 from slipping off the shoulder of the user.

Figure 8:
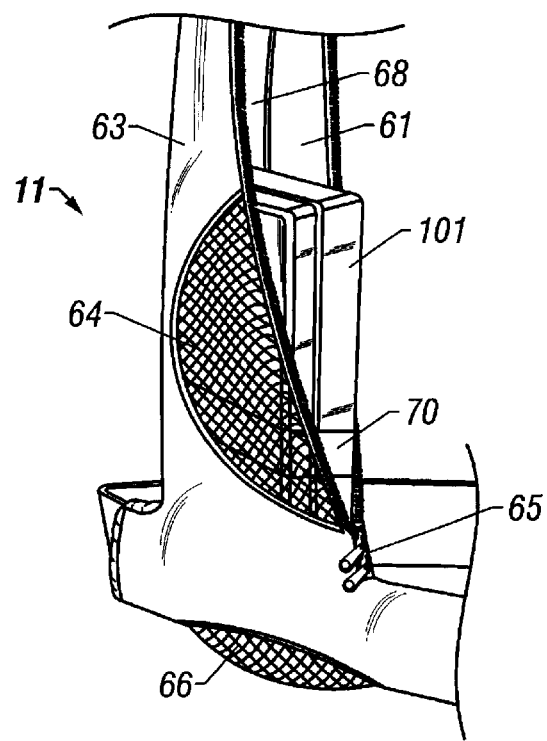
FIG. 8 is an enlarged front isometric view of the harness and user of FIG. 7 showing a computer in the primary compartment.
Figure 9:
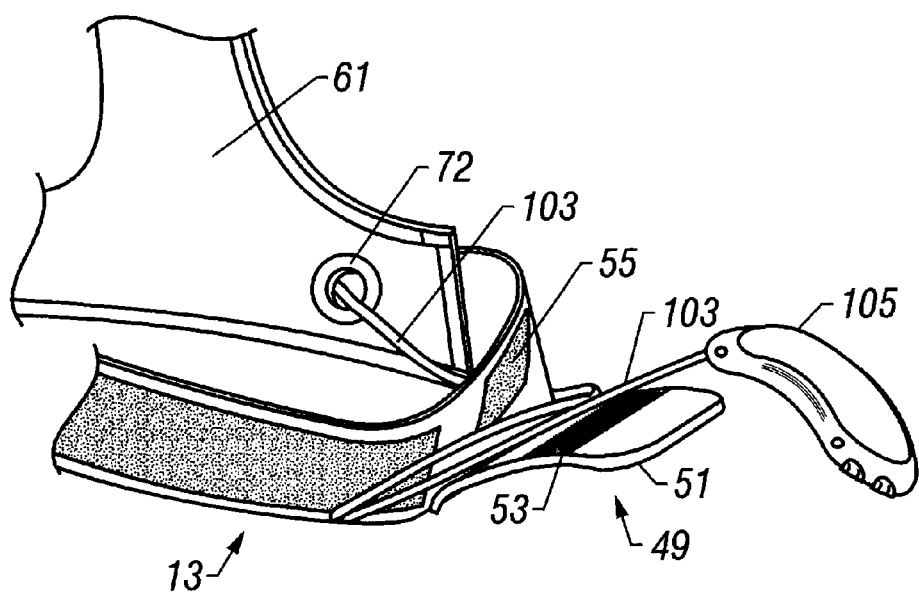
FIG. 9 is a rear isometric view of the harness of FIG. 1 showing the installation of a user interface in the retention device.

Harness 11 is ideally suited for supporting a wearable computer system 101 (FIG. 8) and other associated or peripheral equipment on the body of the user, such as a display driver box for a head mounted display 111 (FIGS. 6–7), a power source or battery 113 (FIGS. 12 and 15), and system expansion devices. However, harness 11 may be used to support other types of equipment as well. As shown in FIG. 8, the computer 101 is installed in primary compartment 29 by unzipping zipper 65 and inserting it between inner and outer layers 61, 63. At least one of the elastic straps 68, 70 is used to secure computer 101 and any other peripheral equipment inside primary compartment 29. The padding of inner layer 61 provides greater comfort for the user and insulates the user from the heat generated by computer 101, while the windows 64, 66 in outer layer 63 ventilate computer 101 to the ambient environment.

Figure 10:
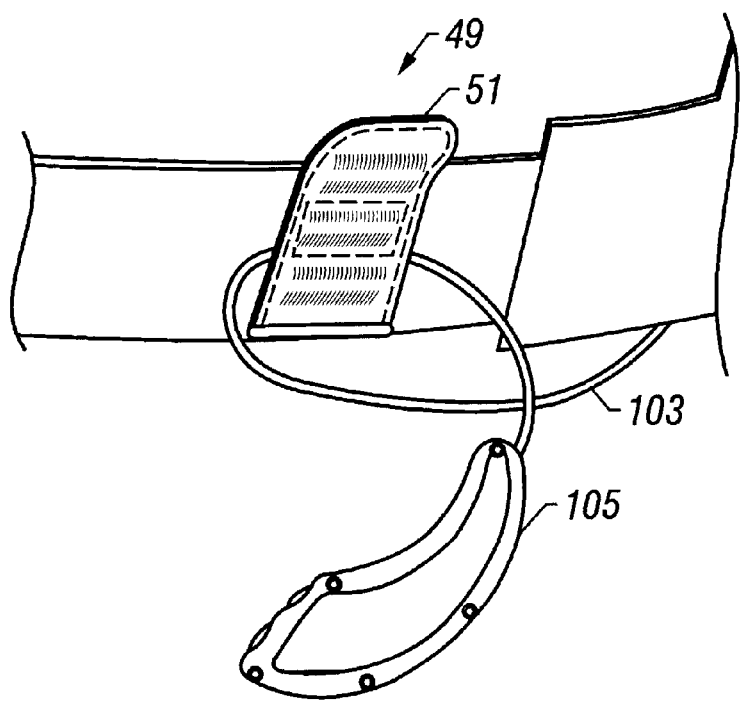
FIG. 10 is an isometric view of the harness showing the user interface of FIG. 9 supported by the retention device.
Figure 11:
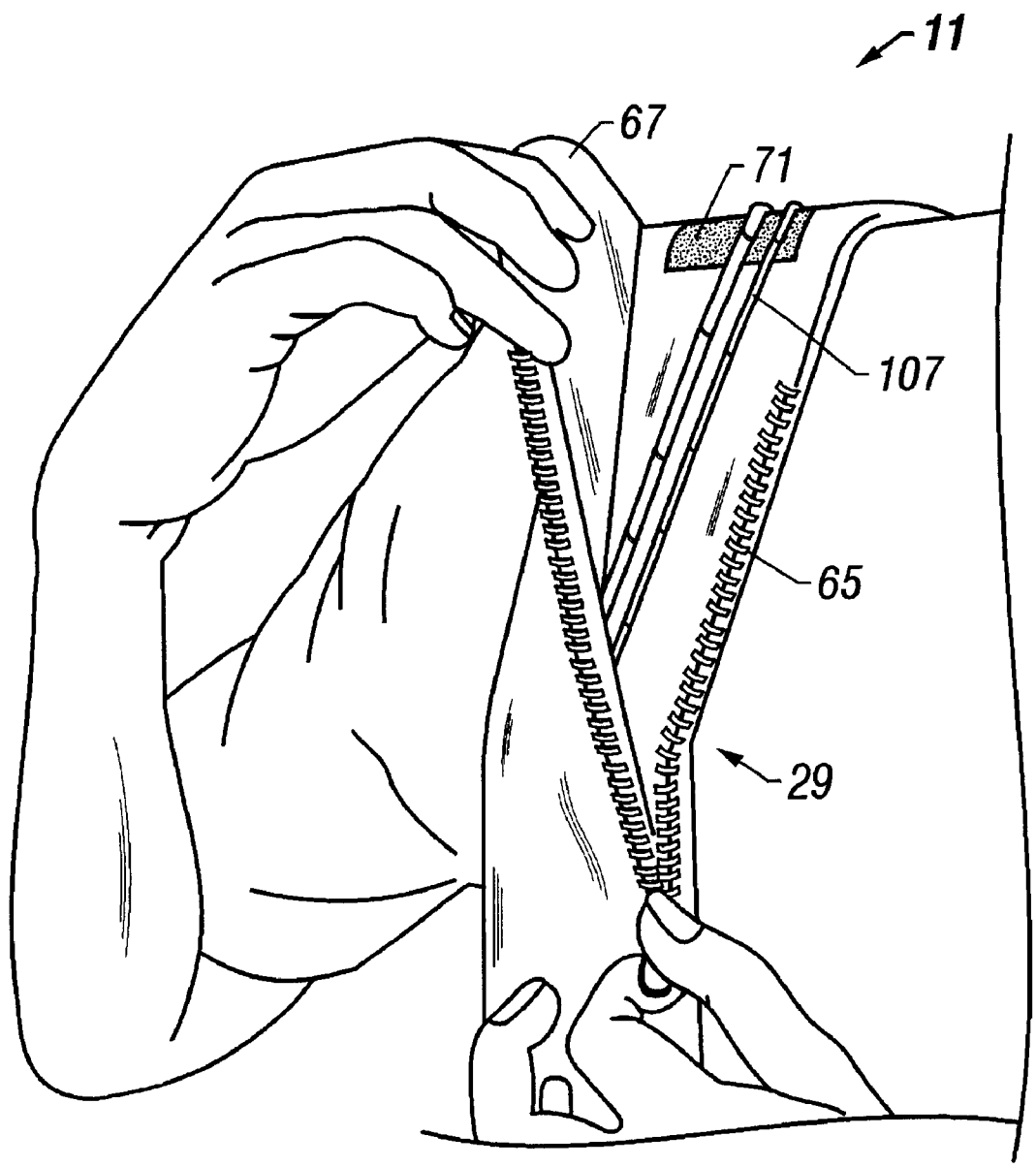
FIG. 11 is an isometric view of the harness and user of FIG. 7 with an auxiliary closure of the primary compartment in an open position.
Figure 13:
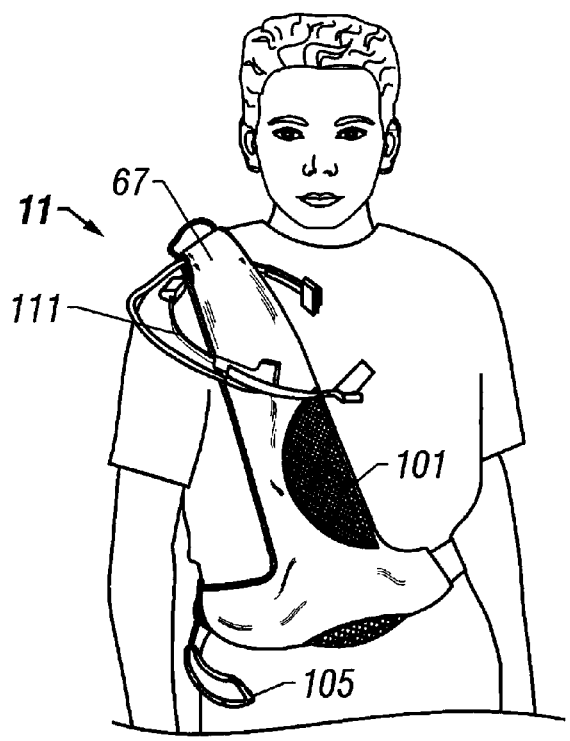
FIG. 13 is a front isometric view of the harness of FIG. 1 loaded with equipment and donned by a user prior to operation of the equipment.

Computer 101 may be provided with a cable 103 (FIG. 9) that extends through eyelet 72 in inner layer 61 to a hand-held mouse, track point device 105, or other user interface, such as a wrist-mounted keyboard, etc. Excess length of cable 103 may be retained by retention device 49 on the exterior of waist belt 13. To capture the excess length of cable 103, flap 51 is pulled away from waist belt 13 such that hooks 53 disengage loops 55 and the cable 103 is placed therein before reclosing flap 51 (FIG. 10). As shown in FIG. 11, the signal wires or other cables 107 extending from computer 101 (FIG. 8) may be routed up through primary compartment 29 and out auxiliary sealable closure 67 to extend to still other equipment that is external to primary compartment 29. The hook-and-loop fasteners (FIG. 3) of auxiliary sealable closure 67 operate in a similar manner as those of retention device 49. In addition, closure 67 may be used to support and retain head mounted display 111 or other equipment, as shown in FIG. 13.

Figure 14:
FIG. 14 is a front isometric view of the harness and user of FIG. 13 in operation.
Figure 15:
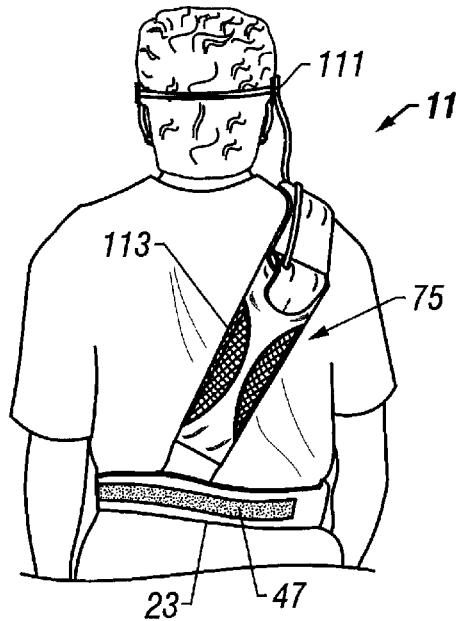
FIG. 15 is a rear isometric view of the harness and user of FIG. 13 in operation.

Referring now to FIG. 12, the battery 113 and/or other equipment may be located in secondary compartment 75 on the back of the user. Power wires or other cables 117 extend through hole 92 in flap 87 to primary compartment 29. Like primary compartment 29, inner layer 79 (FIG. 1) is padded for the comfort of the user and insulates the user from the heat generated by the components inside secondary compartment 75. Windows 83, 85 in outer layer 81 ventilate the components to the ambient environment. As shown in FIGS. 13–15, harness 11 allows the user to utilize computer 101 and its associated equipment virtually "hands-free" other than user interface 105. Alternatively, computer may be provided voice recognition software and the appropriate hardware for voice command input.

The present invention has several advantages. The harness comprises two integrated components (a waist belt and a single shoulder sling) that facilitate computer usability while minimizing discomfort and cumbrousness for the user wearing the harness. The harness has the ability to store/route cables and/or wiring for the various components, such as the hard-wired versions of the head mounted display and user interface device, that are used in conjunction with the wearable computer. The harness is also much easier for a user to put on and to remove from his or her body than conventional, prior art vest-type garments. Moreover, some of the computer components, such as the head mounted display, must be installed in the prior art garments after the garments are placed on the users. In contrast, the harness of the present invention is capable of containing every component associated with the computer prior to the harness being worn by the user.

The present design uses a smooth pouch approach to package all of the elements into one continuous, streamlined shape. This makes all of the bulky, individual parts look smaller and less confusing. The smooth form conforms to the body of the user and is much less likely to get caught on anything as the user moves in his or her environment. This is particularly important in industrial applications, which is the most common application for the present invention. The harness provides flexibility since the compartments or pouches can hold various sizes and shapes of equipment. This allows the user to add attachments and be able to store them in the pouch area without modification, all the while allowing the user to be hands-free. The pouches provide enormous cable management capabilities. Almost no cables or wires or exposed to interfere with the user, or the task that the user is engaged in. Thus, the harness is safer than prior art devices and more visually or aesthetically pleasing.

The outer portions of the garment are made of neoprene foam and provide protection for the computer while diverting the heat generated by the equipment away from the body of the user. The harness shape along with provision for storage of the head mounted display, allows for ease of donning and removal of the whole system with minimal adjustment. The user wearing the harness of the present invention can move, work, and sit unencumbered without the system getting in the way. The harness is designed such that the user can easily put on the wearable computer and its accessories without any assistance since it is not as awkward as current systems on the market.

While the invention has been shown or described in only some of its forms, it should be apparent to those skilled in the art that it is not so limited, but is susceptible to various changes without departing from the scope of the invention.

What is claimed is:

1. A garment for equipment that is worn on a body of a user, comprising:

a waist belt adapted to be worn about a waist of the user;

adjustment means for adjusting a circumference of the waist belt; and a shoulder sling extending from the waist belt, and adapted to be worn over one of the shoulders of the user; wherein the shoulder sling comprises:

a primary compartment integrally formed with the shoulder sling between a plurality of layers of the shoulder sling, the primary compartment having a first sealable closure for housing a first component of the equipment; and a secondary compartment integrally formed with the shoulder sling between a plurality of layers of the shoulder sling, the secondary component having a second sealable closure for housing a second component of the equipment.

2. The garment of claim 1 wherein the adjustment means is an extensible strap for adjusting the circumference of the waist belt.

3. The garment of claim 1 wherein the waist belt is substantially inelastic, and the shoulder sling has elastic and inelastic portions.

4. The garment of claim 1 wherein the first sealable closure of the primary compartment is a zipper.

5. The garment of claim 1 wherein each of the adjustment means, the primary compartment, and the secondary compartment has hook-and-loop fasteners.

6. The garment of claim 1, further comprising an auxiliary sealable closure in the primary compartment, and wherein the primary compartment contains an elastic strap mounted therein for retaining the first component of the equipment.

7. A garment for equipment that is worn on a body of a user, comprising:
a waist belt adapted to be worn about a waist of the user;
adjustment means for adjusting a circumference of the waist belt; and
a shoulder sling extending from the waist belt, and adapted to be worn over one of the shoulders of the user, the shoulder sling having a primary compartment with a first sealable closure for housing a first component of the equipment, and a secondary compartment with a second sealable closure for housing a second component of the equipment; wherein
each of the compartments of the shoulder sling has a substantially inelastic backing and an elastic cover with at least one window therein for ventilating the respective compartments.

8. A personal harness that is worn on a body of a user for supporting a wearable computer and associated equipment, the personal harness comprising:
a substantially horizontal, inelastic waist belt adapted to be worn about a waist of the user;
adjustment means for adjusting a circumference of the waist belt;
a substantially vertical shoulder sling extending from the waist belt, and adapted to be worn over one of the shoulders of the user, the shoulder sling having a front sash and a rear sash;
a primary compartment formed in the front sash and having a first sealable closure for housing a first component of the computer, and an auxiliary sealable closure; and
a secondary compartment formed in the rear sash and having a second sealable closure for housing a second component of the computer.

9. The personal harness of claim 8 wherein the adjustment means is an extensible strap for adjusting the circumference of the waist belt.

10. The personal harness of claim 8 wherein each of the compartments has a substantially inelastic, padded backing and an elastic cover with windows located therein for ventilating the respective compartments.

11. The personal harness of claim 8 wherein the first sealable closure of the primary compartment is a zipper.

12. The personal harness of claim 8 wherein each of the adjustment means, the auxiliary sealable closure, and the second sealable closure utilize hook-and-loop fasteners.

13. The personal harness of claim 8 wherein the primary compartment contains an elastic strap mounted therein for retaining the first component of the computer.

14. The personal harness of claim 8 wherein the waist belt and adjustment means utilize a strap having a buckle and an extensible portion with hook-and-loop fasteners for adjusting the circumference of the waist belt.

15. The personal harness of claim 8 wherein the auxiliary sealable closure is adapted to support and retain a head mounted display.

16. The personal harness of claim 8 wherein the shoulder sling has a textured inner surface for resisting slippage of the shoulder sling with respect to a shoulder of the user.

17. The personal harness of claim 8, further comprising an eyelet on an inner surface of the front sash of the shoulder sling and in communication with the primary compartment for accommodating wiring extending from the first component of the computer.

18. The personal harness of claim 8, further comprising a retention device mounted to the waist belt for retaining an excessive length of wiring associated with the computer.

19. A personal harness that is worn on a body of a user for supporting a wearable computer and associated equipment, the personal harness comprising:
a substantially horizontal, inelastic waist belt adapted to be worn about a waist of the user;
an extensible strap for adjusting a circumference of the waist belt;
a substantially vertical shoulder sling adapted to be worn over one of the shoulders of the user, the shoulder sling having front and rear sashes that extend from front and rear portions, respectively, of the waist belt;
a primary compartment formed in the front sash and having a first sealable closure for housing a first component of the computer, and an auxiliary sealable closure located at an upper end of the first sealable closure;
a secondary compartment formed in the rear sash and having a second sealable closure for housing a second component of the computer; and wherein
each of the compartments has a substantially inelastic, padded backing and an elastic cover with windows located therein for ventilating the respective compartments.

20. The personal harness of claim 19 wherein the first sealable closure of the primary compartment is a zipper.

21. The personal harness of claim 19 wherein each of the waist belt and extensible strap, the auxiliary sealable closure, and the second sealable closure utilize hook-and-loop fasteners.

22. The personal harness of claim 19 wherein the primary compartment contains elastic straps mounted therein for retaining the first component of the computer.

23. The personal harness of claim 19 wherein the auxiliary sealable closure is adapted to support and retain a head mounted display.

24. The personal harness of claim 19 wherein the shoulder sling has a textured inner surface for resisting slippage of the shoulder sling with respect to a shoulder of the user.

25. The personal harness of claim 19, further comprising an eyelet on an inner surface of the front sash of the shoulder sling and in communication with the primary compartment for accommodating wiring extending from the first component of the computer.

26. The personal harness of claim 19, further comprising a retention device mounted to the waist belt for retaining an excessive length of wiring associated with the computer.

* * * * *